United States Patent [19]

McMaster et al.

[11] Patent Number: 4,822,398
[45] Date of Patent: Apr. 18, 1989

[54] GLASS BENDING AND TEMPERING APPARATUS

[76] Inventors: Harold A. McMaster, 707 Riverside Dr., Woodville, Ohio 43469; Norman C. Nitschke, 29737 E. River Rd.; Dexter H. McMaster, 1070 Elm St., both of Perrysburg, Ohio 43551; Ronald A. McMaster, 420 Water St., Woodville, Ohio 43469

[21] Appl. No.: 83,675

[22] Filed: Aug. 7, 1987

[51] Int. Cl.[4] ................ C03B 23/03; C03B 27/04
[52] U.S. Cl. ........................ 65/273; 65/104; 65/106; 65/289; 65/290
[58] Field of Search ............ 65/106, 107, 273, 289, 65/290, 104

[56] References Cited

U.S. PATENT DOCUMENTS

| | | | |
|---|---|---|---|
| 4,111,676 | 9/1978 | Mechling et al. | 65/104 X |
| 4,376,643 | 3/1983 | Kahle | 65/273 X |
| 4,483,703 | 11/1984 | Keller et al. | 65/106 X |

Primary Examiner—Arthur Kellogg

[57] ABSTRACT

A glass bending and tempering apparatus (20) is disclosed as including a pair of opposed bending platens (24) for receiving a heated glass sheet (22) to be bent therebetween. At least one of the bending platens (24) is deformable and includes an actuator (32) for deforming the platens from a planar shape to a bent shape to bend the heated glass sheet. Said one platen (24) includes quench openings (42) that move with said platen during the deformation of the platen and subsequently supply quenching gas to temper the bent glass sheet (22).

11 Claims, 4 Drawing Sheets

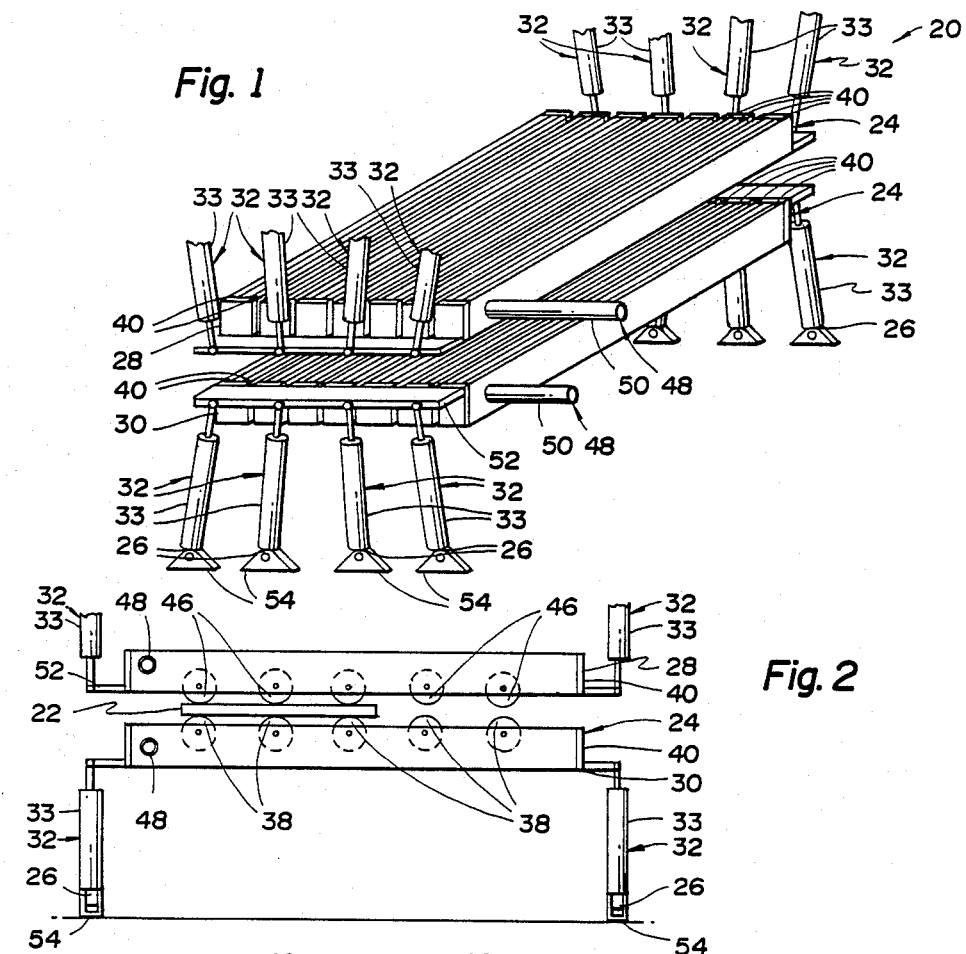
Fig. 1
Fig. 2
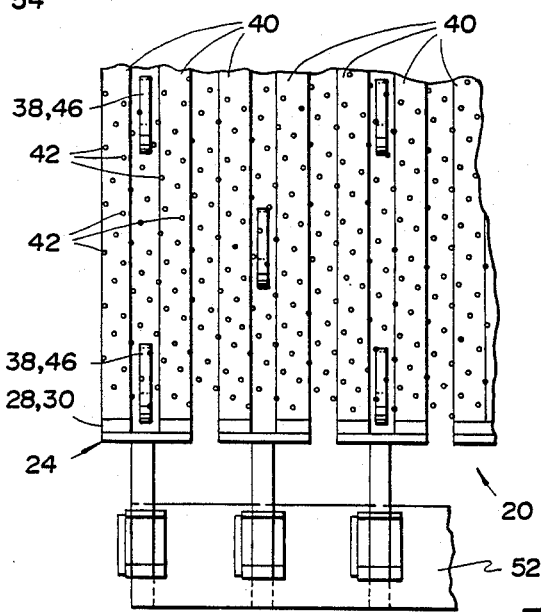
Fig. 4
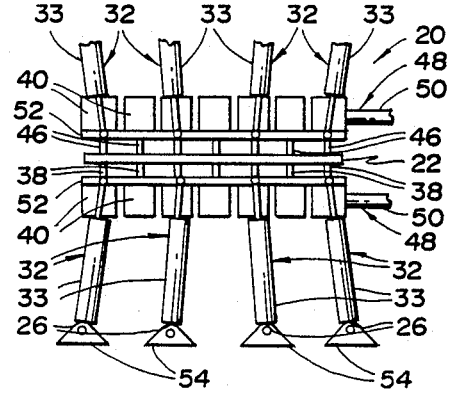
Fig. 3

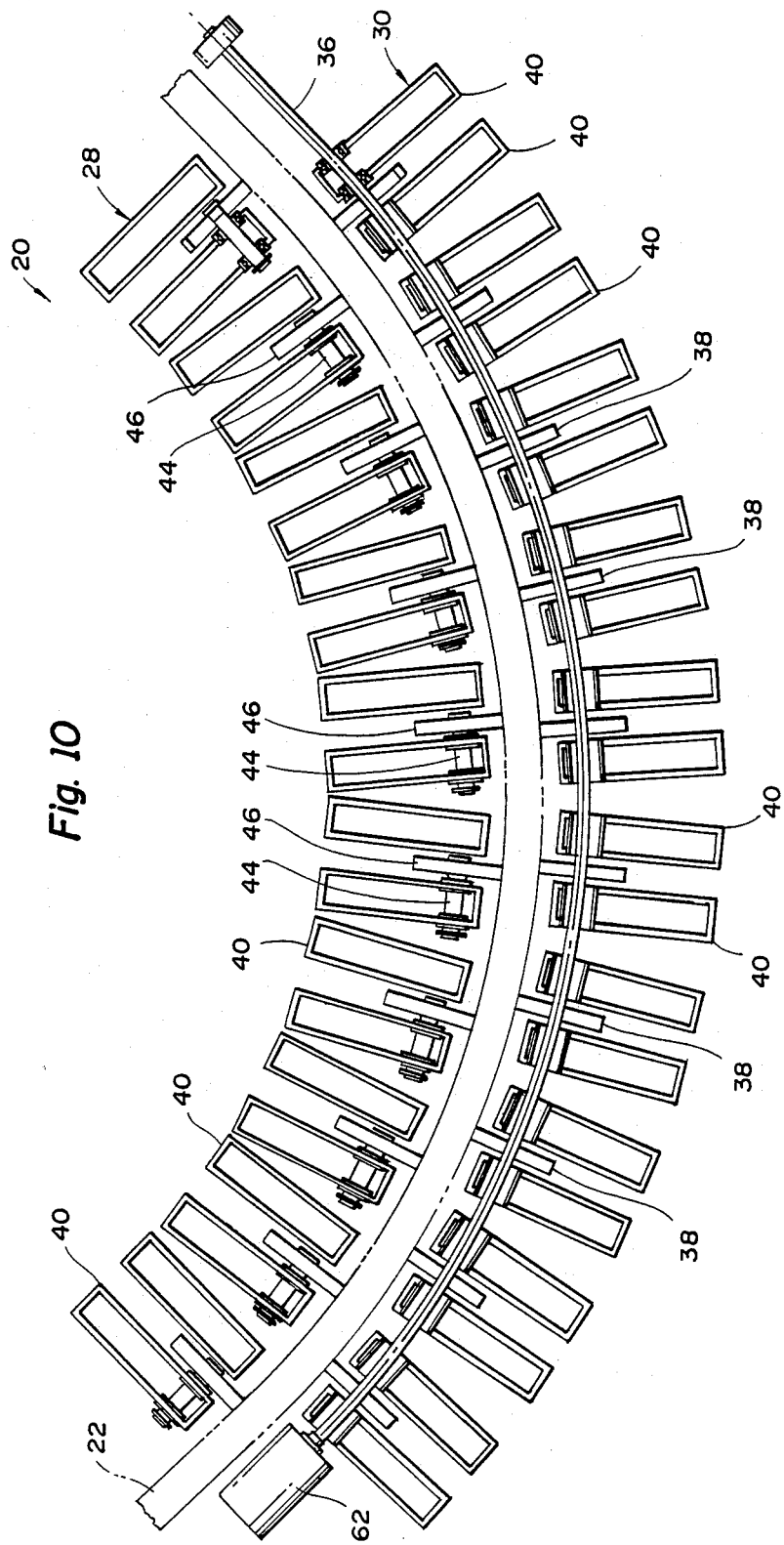

GLASS BENDING AND TEMPERING APPARATUS

TECHNICAL FIELD

This invention relates to an apparatus for bending and tempering sheet glass.

BACKGROUND ART

Glass sheets are bent and quenched to provide a desired shape for a particular application and to improve the mechanical characteristics of the bent glass sheet, respectively. Typically, the glass sheet to be bent is heated to its deformation point of about 1200°-1300 F. and then bent to the required shape before being rapidly cooled by an air spray to temper the glass. Tempering greatly increases the mechanical strength of the glass and its resistance to breakage as well as causing the glass to break into small relatively dull pieces when broken instead of into large sharp slivers as in the case with untempered glass. Glass sheets have been known to be sag bent on horizontal molds having a curved bending surface on which a glass sheet is placed on the bending surface and heated to a bending temperature where the sheet sag bends under its own weight to conform to the shape of the bending surface. Heat softened glass sheets have also been known to be press bent between male and female members of a press bending mold. In addition, glass sheets have been known to be bent on vacuum molds.

Conventional glass sheet bending operations typically involve a two-step bending and quenching operation where bending and tempering take place at different stations. In some conventional press bending operations, press face distortion occurs to the bent glass sheet. Once the heat softened glass sheet is bent at the bending station it must be transported to a quenching station where the bent glass sheet is exposed to an air spray to temper the glass sheet. As the glass is being transported, roll marking has been known to occur as well as premature cooling prior to the quenching step resulting in a partial tempering of the bent glass sheet. Also, once the glass sheet arrives at the quenching station, the quenching air typically is applied in a non-uniform manner with respect to the bend in the bent glass sheet causing unbalanced rates of cooling over the surface of the glass sheet. Furthermore, the exit temperature of the glass sheet in a two-step operation must be higher to allow for the increased transportation time of the heated glass sheet.

Prior art reference noted by a search conducted prior to filing this application are discussed below. U.S. Pat. No. 4,277,276 to John D. Keller et al provides a vacuum mold capable of defining a flat configuration or a selected curve configuration that is capable of engaging a heat softened flat glass sheet by applying vacuum while engaged with the glass sheet in the flat configuration and bending the glass by deforming the mold to the selected curve configuration. The curved glass sheet is quenched at a quench station separate from the bending station where the vacuum mold is located.

U.S. Pat. No. 4,236,909 to Dean L. Thomas et al provides an apparatus for heat strengthening glass sheets which includes a cooling station and a set of nozzles on each side of a path of glass travel to thereby force cool the glass sheets at a more rapid rate than its normal rate of cooling. No bending is provided for by this apparatus.

U.S. Pat. No. 4,203,751 to Mario Roth et al provides a process utilizing vertical male and female mold members having center and jointed elements. The molds are brought together to confine a heat softened sheet of glass between the center elements and the jointed elements are simultaneously moved to bend the portion of the sheet engaged between the jointed elements with respect to the center portion of the sheets. No quenching apparatus is provided.

U.S. Pat. No. 2,223,124 to William Owen provides a method and apparatus for bending and case hardening glass sheets on a horizontal runway having rolls which are movable to sag so that the peripheries of the rolls engaging the lower surface of the glass sheet describe the curvature to which it is desired to bend the sheet. The bent glass sheet is quenched by air blasts eminating from stationery nozzles that do not conform to the shape of the bent glass sheet resulting in non-uniform cooling of the glass sheet. Also, no topside bending surface is used requiring higher glass sheet temperatures to bend the glass sheet.

DISCLOSURE OF INVENTION

An object of the present invention is to provide an apparatus for bending and tempering sheet glass at one station and to reduce roll marking and press face distortion as well as lowering the glass temperature necessary for the combined bending and quenching operation.

Another object of the invention is to provide an apparatus that has movable quench openings that move with the surfaces of the flat glass sheet to provide equal thermal conditions during tempering and a more uniformly tempered glass sheet.

In carrying out the above objects and other objects of the invention, the glass bending and tempering apparatus constructed in accordance with the invention comprises a pair of opposed bending platens for receiving a heated glass sheet to be bent therebetween. At least one of the bending platens is deformable and includes an actuator for deforming the platen from a planar shape to a bent shape to bend the heated glass sheet. Said one of the platens includes quench openings that move therewith during the deformation of the platens and subsequently supply quenching gas to temper the bent glass sheet.

In the preferred embodiment of the invention, the bending and tempering apparatus includes supports that mount the opposed bending platens at upper and lower locations with respect to each other. The lower bending platen is deformable and has a connection to the actuator so as to deform the lower platen from a planar shape to a bent shape. The upper bending platen is conformingly deformable to the shape of the lower platen to bend the heated glass sheets therebetween. Both of the platens include quench openings that move therewith during the deformation of the platens and subsequently supply quenching gas to temper the bent glass sheet.

The lower platen includes deformable drive shafts, drive wheels mounted on the drive shaft to engage the heated glass sheet and provide movement thereof during platen deformation that provides the bending and quench tubes that define the quench openings of the lower platen and rotatably support the drive shafts thereof such that the drive wheels move the heated glass sheet during the bending. The upper platen includes idler shafts, idler wheels mounted on the idler shafts to engage the heated glass sheet and to rotate with movement of the glass sheet, and quench tubes that define quench openings of the upper platen and rotatably support the idler shafts.

The apparatus further includes a source of quenching gas and a connector for connecting the source of quenching gas to the quench tubes. A means reversibly drive the drive wheels to move the glass sheet during the bending and quenching. In the most preferred embodiment of the invention, the means comprises a control and reversible drive electric motors operated by the controls.

Spacer wheels are mounted to the platens and separate the opposed platens from contact so that the heated glass sheet can be introduced therebetween. An adjuster is provided for adjusting the spacer wheels to provide variable separation between the platens so that different thicknesses of glass sheets can be bent and quenched.

The spaced quench tube construction of the apparatus facilitates the escape of spent quenching gas after impingement with the glass sheet, thereby reducing back pressure, and is also useable with flat glass sheet tempering as well as bent glass sheet tempering.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a perspective view of a glass bending and tempering apparatus constructed in accordance with the present invention and illustrated with a pair of opposed bending platens in a flat configuration;

FIG. 2 is a side view of the apparatus shown in FIG. 1 illustrating the direction of glass sheets travel on drive and idler wheels;

FIG. 3 is an end view of the apparatus shown in Figure illustrating actuators for deforming the opposed platens from a flat configuration to a bent configuration;

FIG. 4 is a partial sectional plan view of one of the bending platens illustrating quench tubes having quench openings and the impingement pattern of quenching gas on glass sheets;

FIG. 10 is a sectional view taken along the line 10—10 in FIG. 9 illustrating the quench tubes, a drive shaft and drive wheels, and idler shafts and idler wheels.

BEST MODE FOR CARRYING OUT THE INVENTION

Figure 5:
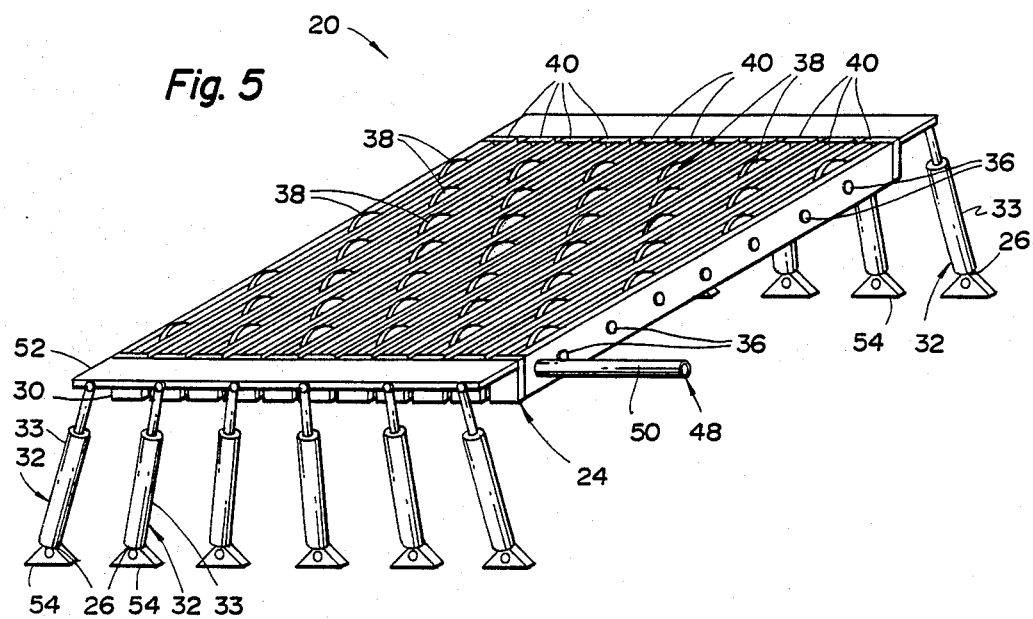
FIG. 5 is a perspective view of the lower bending platen illustrating the actuators, the quench tubes and the reversibly driven drive wheels.

Referring the FIG. 1 of the drawings, a glass bending and tempering apparatus constructed in accordance with the present invention and generally indicated by reference numeral 20 and is used to bend and quench a heated glass sheet 22 at one station. As is hereinafter more fully described, the bending and tempering apparatus 20 reduces roll marking and press face distortion normally associated with conventional bending and tempering systems as well as provides for using a lower glass temperature for the combined bending and quenching operation. The apparatus 20 also utilizes a quench that moves with the glass sheet 22 to provide equal thermal conditions during tempering and a more uniformly tempered glass sheet.

As shown in FIG. 1, the glass bending and tempering apparatus 20 comprises a pair of opposed bending platens 24 for receiving the heated glass sheet 22, heated to the glass deformation temperature in a glass heating furnace not shown, to be bent therebetween. Apparatus 20 is positioned in an end to end relation with the furnace to reduce the duration of travel the glass sheet 22 undergoes before bending and quenching. Supports 26 mount the opposed bending platens 24 at upper and lower locations with respect to each other to define upper and lower bending platens 28 and 30 respectively. Actuators 32, shown here as piston and cylinder 33 arrangements, deform the lower platen 30 from a planar shape to a bent shape to bend the heated glass sheet 22. Actuators 32 are also operated to restore the bending platens 24 to the planar shape after bending. The upper bending platen 28 is conformingly deformable to the shape of the lower platen 30 and deforms under its own weight as the lower bending platen is bent to bend the heated glass sheet therebetween. Both upper and lower platens 28 and 30 respectively shown include quench openings 34, best seen in FIG. 6, that move therewith during the deformation of the platens 24 and subsequently supply quenching gas, such as air or any other well known tempering medium, to temper the bent glass sheet.

FIG. 2 illustrates the opposed bending platens 24 in a flat configuration with the glass sheet 22 engaged therebetween the upper and lower bending platens 28 and 30 respectively in preparation for the bending operation. The lower platen 30 includes deformable drive shafts 36 and drive wheels 38 mounted on the drive shafts to engage the heated glass sheet 22 and provide movement of the glass sheet during the platen deformation that provides the bending. Lower platen 30 is best seen in FIG. 5. Drive shafts 36 are relatively thin metal cable shafts that mount the drive wheels 38 although other known drive shafts such as spring metal shafts or pieced shafts can be utilized. The lower platen 30 also includes quench tubes 40 that define quench openings 42 of the lower platen that supply the quenching gas. The quench openings 42 are best seen in the enlarged view of FIG. 6. Here it can be seen that the quench openings 42 are angled to provide a uniform impingement pattern of quenching gas on the glass sheet 22. Quench tubes 40 support the drive shafts 36 such that the drive wheels 38 move the heated glass sheet 22 during the bending operation. The drive shafts 36 rotate in bearings mounted on the quench tubes 40.

Figure 6:
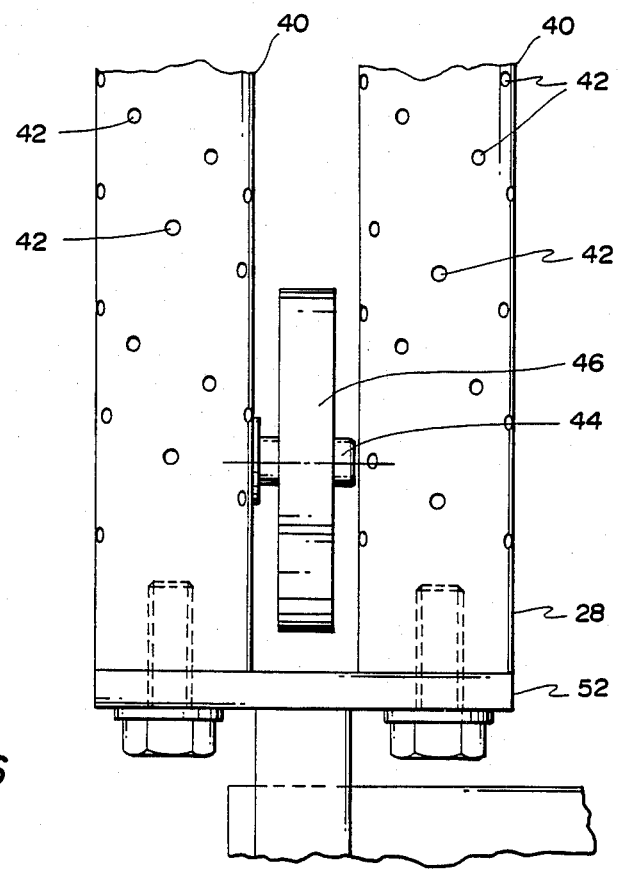
FIG. 6 is a partial plan view of two adjacent quench tubes and an idler wheel of an upper bending platen.

The upper platen 28 includes idler shafts 44 and idler wheels 46 mounted on the idler shafts, best seen in FIG. 6, that engage the heated glass sheet 22 and rotate with movement of the glass sheet as it is oscillated back and forth by the drive wheels 38 during the platen 24 deformation that causes the bending. The glass sheet 22 is kept moving to avoid any marking on the glass sheet and to distribute the bending forces over the surfaces of the glass sheet. The upper platen 28 also includes quench tubes 38 that define quench openings 40 of the upper platen for supplying quenching gas to temper the glass sheet 22. The quench tubes 38 of the upper bending platen 28 rotatably support the idler shafts 44. Idler shafts 44 are short rigid shafts mounted in bearings that are mounted on the quench tubes 40, however, fixed shafts and idler wheels with bearings are equally applicable.

As illustrated in FIG. 3, the apparatus 20 includes a source 48 of quenching gas and a connector 50 for connecting the source of quenching gas to the quench tubes 40. Connector 50 is shown here as flexible tubing attached to the quench tubes 40. Also illustrated are the actuators 32 connected to the bending platens 24. A connecting strap 52 connects the quench tubes 40 that define the upper and lower platens 28 and 30 respectively. Connecting strap 52 comprises a flexible material that can withstand repeated bending and straightening. Most preferably, connecting strap 52 is made of plastic. The actuators 32 are also rigidly mounted to a piston mount platform 54 shown below the apparatus 20 but not above. Glass sheet 22 is bent by raising and lowering the piston and cylinder 33 arrangements to move the platens 24 with the glass sheet therebetween.

FIG. 4 illustrates the quench openings 42 in quench tubes 40 as well as the pattern of impingement of the quenching gas on the glass sheet 22. Quenching gas is supplied by source 48 through connector 50 into the quench tubes 40 and exited through the quench openings 42. The uniform pattern of quenching gas impingement has been accomplished by drilling the quench openings 42 in quench tubes 40 at various predetermined angles in order to create a plurality of nozzles that deliver quenching gas to the bend glass sheet 22. This uniform pattern of quenching gas impinging on the glass sheet 22 provides equally balanced thermal conditions across the surfaces of the bent glass sheet 22 during quenching resulting in a more uniformly tempered glass sheet that could not be accomplished by the prior art.

Figure 7:
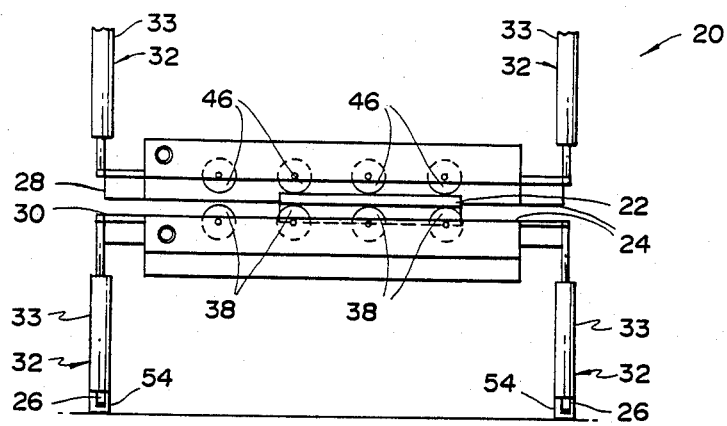
FIG. 7 is a side view of the apparatus shown in FIG. 1 illustrating the opposed bending platens in the bent configuration.
Figure 8:
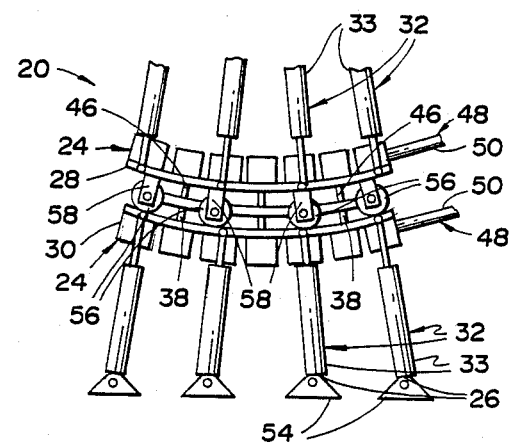
FIG. 8 is an end view of the apparatus shown in FIG. 1 illustrating the opposed bending platens in the bent configuration and also illustrating spacer wheels separating the opposed platens from contact.
Figure 9:
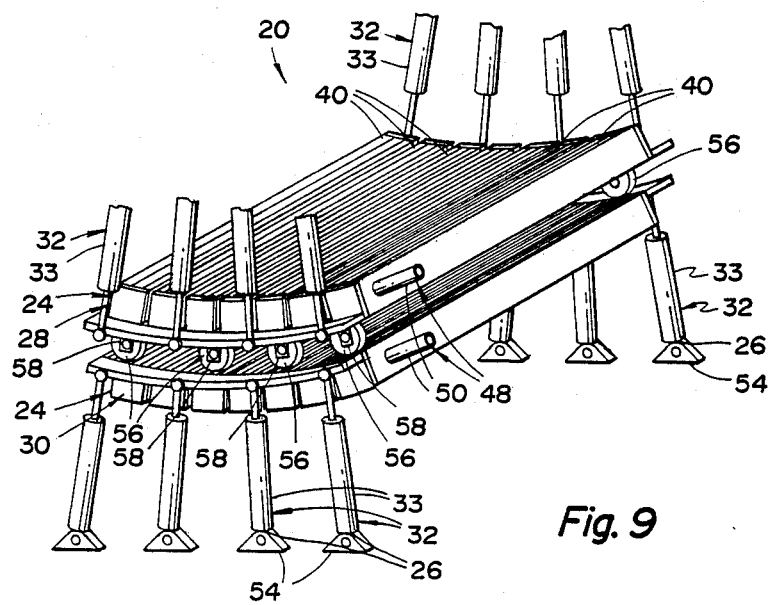
FIG. 9 is a perspective view of the apparatus shown in FIG. 1 illustrated in the bent configuration.

FIGS. 7-9 illustrate the apparatus 20 in the bent configuration where actuators 32 have been operated by automatic or manual controls to deform the lower bending platens 30 from a planar shape to a bent shape by expanding and contracting the piston and cylinder 33 arrangement. As the lower platen 30 is bent, the upper platen 28, by its own weight, conforms to the shape of the lower platen. Spacer wheels 56, best seen in FIGS. 8 and 9, are mounted on the platens 24 to separate the opposed platens from contact and so that the heated glass sheet 22 can be introduced therebetween. Preferably, an adjuster 58 is included on the spacer wheels 56 to provide variable separation between the platens so that different thicknesses of glass sheets can be introduced between the platens. Actuators 32 are operated to return both platens 24 to the planar shape after the bent glass sheet 22 has been exited the apparatus 20.

FIG. 10 is a sectional view taken along the line 10—10 in FIG. 9 looking in the direction the glass sheet 22 is moved on the apparatus 20. As the platens 24 are bent from the planar shape to the bent shape to bend the glass sheet 22, the glass sheet is kept moving back and forth by drive wheels 38. Drive wheels 38 also are used to receive and position the glass sheet as it comes from the glass heating furnace and also for exiting the glass sheet from the bending and quenching apparatus 20. A control 60, automatically or manually operated, controls reversible drive electric motors 62 which rotates the drive shafts 36 and drive wheels 38. Movement of the glass sheet 22 during bending distributes the bending forces over a greater surface area of the glass sheet and reduces the possibility of distortion and marking of the glass sheet. Furthermore, the equi-distant separation of the quench tubes 40 and quench openings 42 from the bent glass sheet 22 during the quench provide equal thermal conditions when the quenching gas is applied to the bent glass sheets and uniform tempering throughout the entire glass sheet.

It should also be appreciated that the spaced construction of the quench tubes 40 facilitates escape of the spent quenching gas after impingement with the glass sheets being tempered, thereby reducing back pressure. As such, the spaced quench tube construction is also applicable to tempering of flat glass sheets as well as bent glass sheets.

While the best mode for carrying out the invention has been described in detail, those familiar with the art to which this invention relates will recognize various alternative designs and embodiment for practicing the invention as defined by the following claims.

What is claimed is:

1. A glass bending the tempering apparatus comprising: a deformable platen for receiving a heated glass sheet to be bent; said deformable platen including an actuator for deforming the platen from a planar shape to a bent shape to bend the heated glass sheet; said deformable platen including quench openings throughout the extent thereof; said quench openings of the deformable platen moving therewith during the deformation of the platen to the bent shape; another platen that has quench openings throughout the extent thereof and opposes the bent deformable platen with the bent glass sheet therebetween; and quenching gas being supplied to the quench openings of both platens and thereby to both sides of the glass sheet to temper the bent glass sheet between the platens.

2. An apparatus as in claim 1 further including supports that mount the opposed bending platens at upper and lower locations with respect to each other, the lower bending platen being deformable and having a connection to the actuator so as to deform the lower platen from a planar shape to a bent shape, the upper bending platen being conformingly deformable to the shape of the lower platen to bend the heated glass sheet therebetween, and both of said platens including quench openings that move therewith during the deformation of the platens and subsequently supply quenching gas to temper the bent glass sheet.

3. An apparatus as in claim 2 wherein the lower platen includes deformable drive shafts, drive wheels mounted on the drive shafts to engage the heated glass sheet and provide movement thereof during platen deformation that provides the bending, and quench tubes that define the quench openings of the lower platen and rotatably support the drive shafts thereof such that the drive wheels move the heated glass sheet during the bending.

4. An apparatus as in claim 3 wherein the upper platen includes idler shafts, idler wheels mounted on the idler shafts to engage the heated glass sheet and to rotate with movement of the glass sheet, and quench tubes that define the quench openings of the upper platen and rotatably support the idler shafts.

5. An apparatus as in claim 3 further including a source of quenching gas and a connector for connecting the source of quenching gas to the quench tubes.

6. An apparatus as in claim 5 further including means for reversibly driving the wheels to move the glass sheet during the bending and quenching.

7. An apparatus as in claim 6 wherein said means comprises a control and reversible drive electric motors operated by the control.

8. An apparatus as in claim 7 further including spacer wheels mounted to the platens that separate the opposed platens from contact so that the heated glass sheet can be introduced therebetween.

9. An apparatus as in claim 8 further including an adjuster for adjusting the spacer wheels to provide variable separation between the platens so that different thicknesses of glass sheets can be bent and quenched therebetween.

10. A glass bending and tempering apparatus comprising: a pair of opposed bending platens at upper and lower locations with respect to each other for receiving a heated glass sheet to be bent therebetween; the lower bending platen being deformable and including an actuator for providing deformation thereof from a planar shape to a bent shape; the upper bending platen being conformingly deformable to the shape of the lower platen to bend the heated glass sheet therebetween; the lower platen including deformable drive shafts, drive wheels mounted on the drive shafts to engage the heated glass sheet and provide movement thereof during platen deformation that provides the bending, and quench tubes that define quench openings of the lower platen and rotatably support the drive shafts thereof such that the drive wheels move the heated glass sheet during the bending; the upper platen including idler shafts, idler wheels mounted on the idler shafts to engage the heated glass sheet and to rotate with movement of the glass sheet, and quench tubes that define quench openings of the upper platen and rotatably support the idler shafts; the quench openings being movable with the platens during the deformation of the platens and for subsequently supplying quench gas to temper the bent glass sheet.

11. A glass bending and tempering apparatus comprising: a pair of opposed bending platens at upper and lower locations with respect to each other for receiving a heated glass sheet to be bent therebetween; spacer wheels adjustably mounted to the platens that keep separate the opposed platens so that the heated glass sheet can be introduced therebetween; the lower bending platen being deformable and including an actuator for providing deformation thereof from a planar shape to a bent shape; the upper bending platen being conformingly deformable to the shape of the lower platen to bend the heated glass sheet therebetween; the lower platen including deformable drive shafts, reversibly driven drive wheels that are mounted on the drive shafts to engage the heated glass sheet and provide movement thereof during platen deformation that provides the bending, and quench tubes that define quench openings of the lower platen and rotatably support the support shafts thereof such that the drive wheels move the heated glass sheet during the bending; the upper platen including idler shafts, idler wheels mounted on the idler shafts to engage the heated glass sheet and to rotate with movement of the glass sheet, and quench tubes that define quench openings of the upper platen and rotatably support the idler shafts; the quench openings being movable with the platens during the deformation of the platens and for subsequently supplying quench gas to temper the bent glass sheet.

* * * * *